Feb. 2, 1943.  R. M. MILLER  2,310,107
VIBRATION MOTOR
Filed July 3, 1941  2 Sheets-Sheet 1
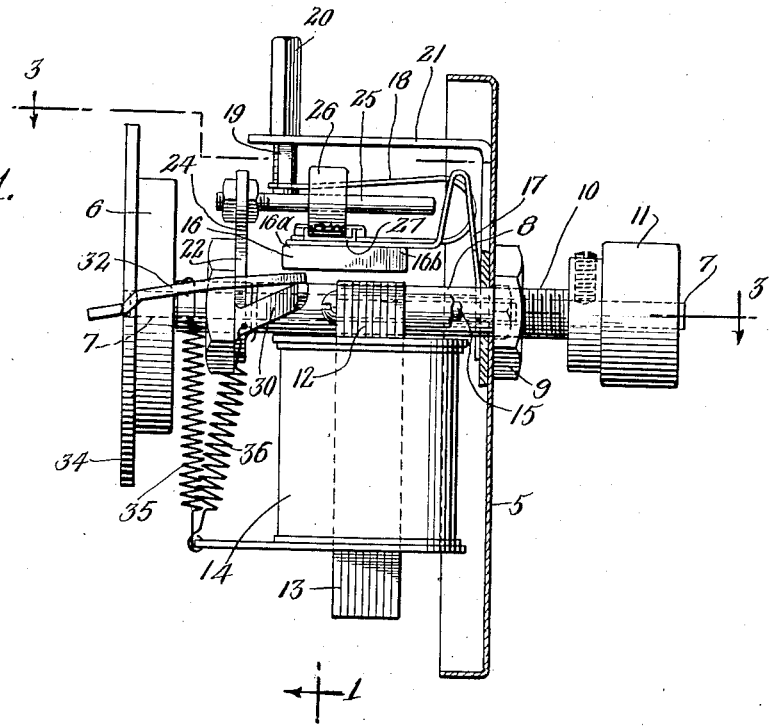
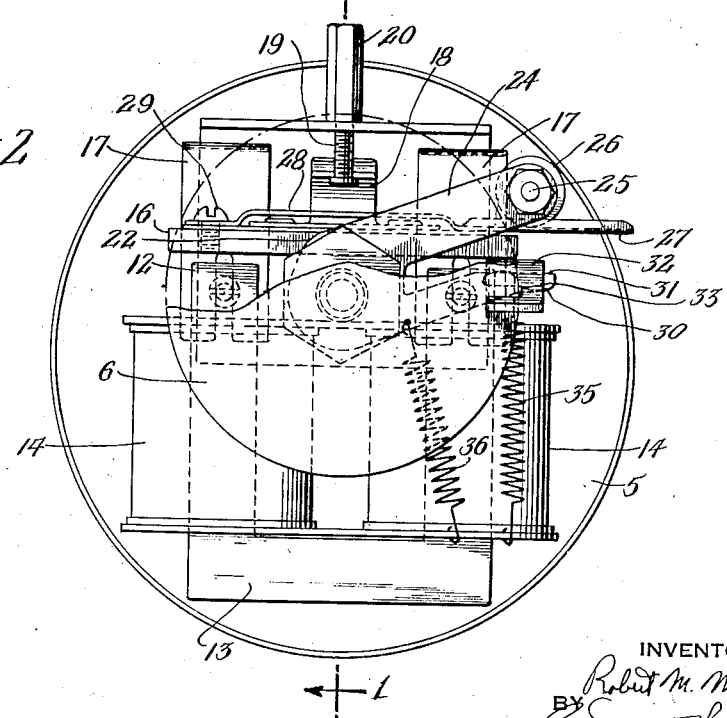
INVENTOR
Robert M. Miller
BY
ATTORNEYS Feb. 2, 1943.                R. M. MILLER                2,310,107
                            VIBRATION MOTOR
                          Filed July 3, 1941              2 Sheets-Sheet 2
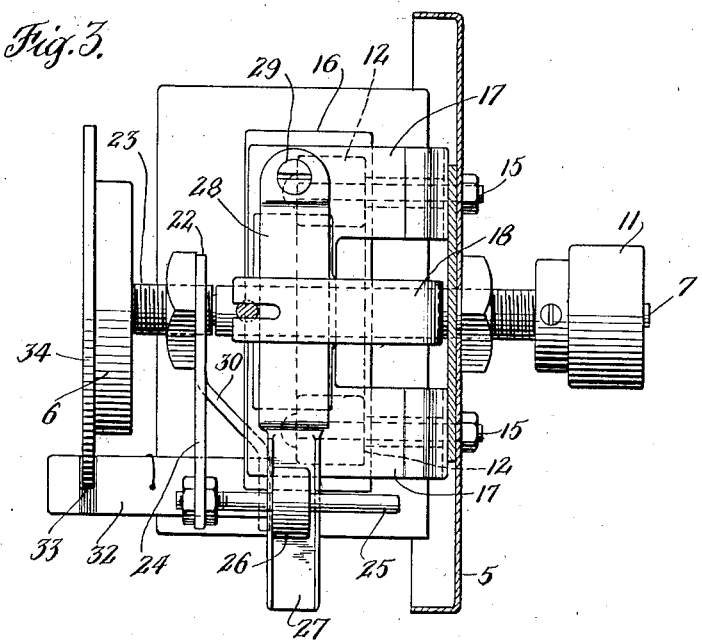
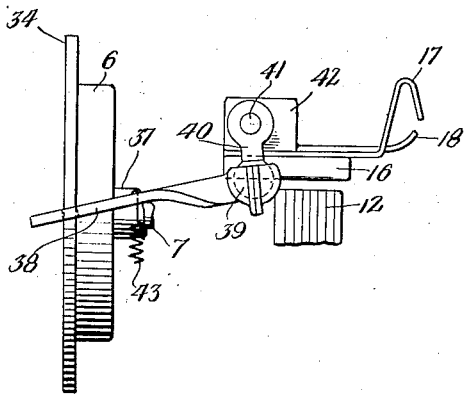
INVENTOR
Robert M. Miller
BY
ATTORNEYS Patented Feb. 2, 1943

2,310,107

UNITED STATES PATENT OFFICE 2,310,107

VIBRATION MOTOR

Robert M. Miller, Philadelphia, Pa., assignor to Fox Products Company, Philadelphia, Pa., a corporation of Pennsylvania Application July 3, 1941, Serial No. 400,885

18 Claims. (Cl. 172—126)

This invention relates to a vibration or impulse motor, and especially to a motor of this general class in which an electromagnetically vibrated armature serves as a driving element and in which a wheel is employed as a driven element, from which wheel power may be taken off for any purposed desired.

The invention has particular reference to the mechanism employed for translating the vibratory motion of the armature into rotary motion of the wheel.

The present application discloses and claims several improvements over the motor of my copending application Serial No. 266,456, filed April 7, 1939, issued December 9, 1941 as Patent No. 2,265,668. As fully disclosed in said copending application, a motor of the general class referred to above is of relatively low speed, so that it is of especial utility for many purposes which heretofore required reduction gearing in association with the more common type of relatively high speed motor. The motor is also of advantage since it is made of relatively few and simple parts and does not employ brushes or a commutator. It may be operated directly from the common source of 110 volt 60 cycle alternating current or, alternatively, on direct current suitably broken up with an interrupter.

The particular features to which the invention of the present application is directed include provision of motion translating mechanism between the vibratory armature and the wheel arranged in a special manner to minimize wear and ensure maximum efficiency in delivery of power from the armature to the wheel. The manner in which this end is achieved will be fully set out hereinafter.

Another important object of the invention lies in improvement of the speed adjustment mechanism, in accordance with which the speed of operation may be varied at will, while maintaining development of substantially the maximum torque of which the motor is capable. The novel speed adjustment mechanism of the present application may be employed either by itself, or in association with the speed adjustment provided in accordance with my aforementioned copending application, in which latter event a further advantage is secured in that the total range of speed adjustment is greatly extended.

How the foregoing objects and advantages are attained, together with others which will occur to those skilled in the art, will be apparent from the following description, referring to the accompanying drawings, in which:

Figure 1 is a vertical sectional view of the motor taken generally as indicated by the section line 1—1 on Figure 2;

Figure 2 is a view taken from the left of Figure 1, with certain portions broken away to disclose others lying behind;

Figure 3 is a plan view, with certain parts shown in section, as indicated by the line 3—3 on Figure 1; and Figure 4 is a fragmentary view, similar to Figure 1, but illustrating a modification.

Referring first to the motor of Figures 1 to 3 inclusive, the parts may be mounted or built up on any suitable support or frame such, for example, as the plate 5. As in my copending application above mentioned, the wheel 6 is mounted on a shaft 7 which is supported in a single sleeve bearing 8 having a shoulder abutting the plate 5, the bearing being secured to the plate by a nut 9 cooperating with an externally threaded extension 10 of the bearing sleeve. Shaft 7 carries a gear, pulley or other power delivery device indicated at 11, which may also serve to position the wheel shaft 7 axially by cooperation with the end of extension 10 of the bearing sleeve.

The poles 12—12 of the core 13 for the electromagnet are disposed one at each side of the bearing sleeve 8, the electromagnet being energized by windings 14—14 which, as above indicated, are adapted to be directly coupled with the common 110 volt 60 cycle current source. The core and windings of the electromagnet are supported from the plate 5 by means of bolts 15.

The vibratory armature 16 is suspended just above and close to the magnet poles 12—12 by means of a pair of springs 17—17 urging the armature toward the poles 12, and also by a spring 18 acting to draw the armature away from the magnet poles. The equilibrium position of the armature, as determined by the oppositely acting springs 17 and 18, may be adjusted by raising or lowering the free end of spring 18, as by a threaded screw 19 engaging the spring, and a cooperating thumb nut 20 bearing against the supporting bracket 21, which latter may conveniently be secured to the frame plate 5 by bolts 15, along with the electromagnet.

The foregoing arrangement of springs provides full floating resilient suspension for the armature, as is mentioned in my said copending application, this type of suspension being preferred over the pivot type for a number of reasons including the fact that transmission of vibrations to the motor frame or support is thereby greatly reduced and also because employment of stops for limiting the stroke of the armature is unnecessary.

Adjustment of the thumb nut 20 effectively raises or lowers the equilibrium position of the armature 16, and since the magnetic field increases in intensity as the poles are approached, the vibration stroke of the armature is varied. This is the type of speed adjustment disclosed in my aforesaid copending application and is preferably used herein in association with another speed adjustment fully described hereinafter.

In the motor of Figures 1 to 3, the motor shaft 7 serves to pivotally mount an oscillatory member 22 which may conveniently be carried by a bearing sleeve 23 (see Figure 3) freely mounted on the motor shaft. Member 22 has an upper generally radially extending arm 24 carrying a pin 25 projecting transversely therefrom adjacent to one end of the armature 16. An abutment member, preferably in the form of a pressed fiber or other composition roller 26, is slidably mounted on pin 25 and serves as the element through which the vibration impulses are transmitted from the armature to the oscillatory member 22. Roller 26 bears against the base of a channel 27 which is connected with strip 28 attached to the armature by means of a screw 29. Screw 29 serves as a pivot about which strip 28 and channel 27 may be swung, as by grasping the outer end of the channel 27, thereby causing roller 26 to move transversely with reference to the armature 16 (to the left or right, when viewed as in Figure 1). This serves as a speed adjustment, the functioning thereof being fully analyzed hereinafter.

Oscillatory member 22 has a second generally radially extending arm 30 having at its outer end a flat surface or edge 31 (see Figure 2) preferably lying substantially in a radial plane containing the axis of wheel shaft 7.

A clutch lever 32, of the type disclosed in my copending application referred to, has its inner end resting upon the straight edge 31 and has, at its outer end, a slot 33 presenting opposed friction gripping surfaces adapted to engage complementary opposite faces of a flange 34 carried peripherally of wheel 6. It will be seen that upon raising the inner end of clutch lever 32, the friction gripping surfaces tighten and continued upward movement of the clutch lever then advances the wheel. Downward movement of the inner end of the clutch lever loosens the grip on the wheel and the clutch lever then may slide downwardly with reference to the wheel flange, so that upon repeated upward and downward vibrations or impulses the wheel is driven step-by-step, although the actual motion of the wheel is virtually without acceleration or deceleration due to the great rapidity of the impulses delivered thereto and further to the fact that the wheel desirably has appreciable weight, so as to provide "flywheel" effect.

A spring 35 acts on the clutch lever to draw the outer end thereof downwardly, thereby maintaining the friction gripping surfaces in contact. Although this spring may also be relied upon to transmit a downward force to arm 30 of oscillatable member 22 and thereby maintain the abutment member 26 in contact with the armature 16, I preferably employ another spring 36 for the latter purpose, since in this way the strength of spring 35 may be reduced, which is of advantage in permitting the clutch lever 32 to accommodate or "self-adjust" itself with reference to its position of friction gripping engagement with the wheel flange 34.

In considering the operation of the structural features of the motor described above, it is first pointed out that accuracy of friction gripping engagement of the clutch lever on the wheel flange is of great importance for two principal reasons. In the first place, accuracy of gripping engagement ensures transmission of maximum power to the wheel flange. Secondly, accuracy of engagement greatly reduces the rate of wear of the complementary gripping surfaces, especially the surfaces on the clutch member.

In addition to the above, the motion of the clutch lever during transmission of a driving impulse to the wheel should be as nearly as possible the same as the motion of the portion of the wheel engaged thereby, i. e., an angular motion about the axis of the wheel. This is important in order to avoid rubbing of the friction gripping surfaces during each driving impulse. To illustrate, if the oscillating and driving motion of the clutch lever take place entirely within a vertical plane, rubbing of the friction gripping surfaces will result because of the fact that the wheel flange has angular movement about the axis of the wheel.

The structure described not only provides a high degree of accuracy of friction gripping engagement but also prevents rubbing of the friction surfaces by virtue of causing the clutch lever to rock somewhat about the axis of the wheel in a manner to accurately follow the angular movement of the wheel flange during each driving step. This is accomplished as follows:

Since the inner end of the clutch lever 32 is flat and bears against the straight edge 31 of arm 30, and since straight edge 31 lies substantially in a radial plane containing the axis of the wheel, the clutch lever partakes of angular motion about the axis of the wheel during each driving stroke, rather than of a purely vertical movement. Moreover, since the pivotal mounting for the oscillatable member 22 is coaxial with the axis of the wheel, as is preferred, and since the clutch lever extends substantially perpendicular to the plane of rotation of the wheel, the angular motion of the clutch lever is identical with that of the portion of the wheel flange engaged thereby. Gripping of the clutch on the wheel flange also aids in maintaining the same relation between the gripping surfaces throughout each driving impulse.

In consequence of the foregoing, rubbing of the friction surfaces is virtually eliminated and wear is reduced to a negligible factor.

The accuracy of friction gripping engagement of the clutch lever with the wheel and the maintenance of a fixed relation between the clutch and wheel during each driving impulse is complicated by virtue of unavoidable manufacturing inaccuracies from motor to motor, and also in the individual motor units. For example, a slight wobbling of the wheel is common. Furthermore, such wear as does occur necessitates a compensating motion of the clutch lever in order to maintain accuracy of the friction grip. Finally, accuracy of friction grip requires slight reciprocatory movement of the clutch lever in a direction toward and away from the wheel because of the fact that each driving stroke requires slight angular oscillation of the lever in one direction in order to tighten the friction grip, the non-driving stroke of the lever being accompanied by oscillation in the opposite direction in order to release the grip.

With the foregoing in mind, the clutch lever is arranged to have freedom for self-adjustment movement, preferably independently of all other parts incorporated in the mechanism for converting the vibratory motion of the armature to rotary motion of the wheel. Thus, as shown in Figures 1 to 3, the clutch lever has a flat surface bearing against the straight edge 31, so that the lever may move inwardly or outwardly to follow the wheel flange, and may also cant about a vertical axis. The mass of the clutch lever being relatively small, ensures that the clutch lever will rapidly and accurately adjust itself to the proper friction gripping position, notwithstanding operation of the motor at a high vibration rate (for example, 240 strokes per second, as occurs when operating on 60 cycle current.)

Turning now to the speed adjustment of Figures 1 to 3, it is first pointed out that the speed adjustment there illustrated (movement of the abutment 26 across the armature) is applicable to any motor in which the vibration of the armature follows or partakes of an angular motion. Although, insofar as the speed adjustment feature is concerned, this type of motion may be provided by a pivotal mounting for the armature, for various reasons hereinbefore mentioned, I prefer to employ a full floating resilient suspension for the armature, and as herein illustrated the springs 17 and 18 are so arranged that the vibration of the armature is at least in part of the angular type. In consequence, a point toward the outer edge 16a of the armature has a longer vibration stroke than a point at the inner edge 16b.

With the foregoing in mind, it will be seen that movement of the abutment 26 in a direction between said inner and outer edge points, as is provided by the guide 27, results in transmission of oscillatory movements to the member 22 of varying magnitude, depending upon the position of adjustment of abutment 26. In turn, the length of driving stroke transmitted to the wheel through the clutch lever 32 may correspondingly be varied so as to control the rate of rotation of the motor.

This speed adjustment is of particular advantage in providing a substantial range of adjustment while maintaining maximum possible torque. The reason for this is that the magnetic field of the electromagnet 14, 12—12 is greatest immediately adjacent to the poles of the magnet, and by adjustment of thumb nut 20 cooperating with spring 18 to bring the equilibrium position of the armature very close to the magnet poles, speed adjustment over a substantial range is provided (by movement of abutment 26), without altering the power available in the vibration stroke. If desired, the thumb nut 20 may be adjusted to shift the equilibrium position of the armature away from the magnet poles, thereby causing the armature to vibrate at a point in the magnetic field of smaller intensity, with consequent decrease in extent of the vibration stroke, and such adjustment will further reduce the speed of rotation of the motor. By a combination of the two speed adjustments described, the effects of which are superimposed on each other, a very wide total range of adjustment is afforded. In an actual construction of a motor of the proportions illustrated having a wheel flange diameter of about one and one-half inches and drawing about 5 watts (110 v. 60 c.), this range has been found to be effective from approximately 1 R. P. M. to approximately 200 R. P. M.

Turning now to the modification of Figure 4, attention is first directed to the fact that the mechanism therein illustrated incorporates modified means providing freedom for various self-adjustment movements of the clutch lever for the purpose of maintaining accuracy of friction gripping engagement with the wheel. As there shown, the wheel 6, having flange 34, is mounted on a shaft 7 which may be supported in any suitable bearing such as indicated at 37. The armature 16 is mounted by means of springs 17 and 18 in position close to the magnet poles 12, it being understood that these parts are arranged in the same general manner as described above with reference to Figures 1 to 3.

Instead of first converting the vibratory motion of the armature to oscillatory motion of an intermediate member, as in Figures 1 to 3, the clutch lever 38 of Figure 4 is provided with a ball or equivalent universal connection 39 with the lower end of a link 40 having a pivotal mounting 41 on a bracket 42 secured to the armature 16 A spring 43 urges the outer end of the lever to swing downwardly to its position providing for engagement of the friction surfaces thereof with the wheel flange. By virtue of the jointed linkage 39, 40 and 41, the clutch lever 38 has freedom for reciprocating movement with respect to armature 16 in a direction toward and away from the wheel flange, which movement is provided in the arrangement of Figures 1 to 3 by virtue of the sliding engagement of the clutch lever on the straight edge 31. In addition, the ball or universal 39 provides a horizontal axis paralleling the plane of rotation of the wheel, about which the lever may swing upwardly and downwardly in order to tighten and release its grip and thereby advance the wheel step-by-step.

Still further, the ball or universal 39 provides another horizontal axis for movement of the clutch lever (perpendicular to the plane of rotation of the wheel, and generally coincident with the major axis of the clutch lever itself) about which the clutch lever may rock in order to follow the arcuate motion of that portion of the wheel flange engaged during each driving stroke and thereby avoid rubbing of the friction surfaces.

I claim:

1. In a vibration motor having an electromagnetically vibrated armature constituting a driving element and a wheel constituting a driven element, mechanism for translating the vibratory motion of the armature into rotary motion of the wheel including a member pivotally mounted coaxially of the wheel and having means extended to abut the armature to receive motion therefrom, yielding means urging said member to move about its pivot axis in a direction to maintain abutment with the armature, whereby the vibratory motion of the armature is converted to oscillatory motion of said member, a clutch lever having opposed friction gripping surfaces cooperating with complementary surfaces of the wheel, the clutch lever being extended to abut the oscillative member, and the lever being oscillatable with reference to said oscillative member while in abutting relation and further having freedom for reciprocatory movement with respect to the oscillative member in a direction toward and away from the wheel to provide for self-adjustment of the lever as to its position of friction gripping engagement with the wheel, the clutch lever alternately engaging and releasing its friction grip on the wheel upon oscillation of the lever in opposite directions to thereby advance the wheel step-by-step, and yielding means associated with the clutch lever and serving to maintain it in abutting relation with the oscillative member and in that position of oscillation of the lever itself in which the friction gripping surfaces thereof are in engagement with the complementary surfaces of the wheel.

2. In a vibration motor having an electromagnetically vibrated armature constituting a driving element and a wheel constituting a driven element, mounting means for the armature providing for angular vibratory movement thereof so that one point on the armature has a longer vibratory stroke than another point, mechanism engaging the armature and the wheel for translating the vibratory motion of the armature into rotary motion of the wheel, including a clutch lever having opposed friction gripping surfaces cooperating with complementary surfaces of the wheel, the lever being oscillatable under the influence of vibratory impulses to alternately tighten and release its frictional engagement with the wheel and thereby to advance the wheel step-by-step, and said mechanism including an adjustable abutment shiftable with respect to the armature to provide for engagement therewith at various points having different lengths of vibratory stroke.

3. In a vibration motor having an electromagnetically vibrated armature constituting a driving element and a wheel constituting a driven element, mounting means for the armature providing for angular vibratory movement thereof so that one point on the armature has a longer vibratory stroke than another point, mechanism for translating the vibratory motion of the armature into rotary motion of the wheel, said mechanism being in engagement with the armature to receive vibratory motion therefrom, and means for shifting the point of engagement of said mechanism with the vibratory armature between said points to vary the stroke of said mechanism and thus the speed of rotation of the wheel.

4. In a vibration motor having an electromagnetically vibrated armature constituting a driving element and a wheel constituting a driven element, mounting means for the armature providing for angular vibratory movement thereof so that one point on the armature has a longer vibratory stroke than another point, mechanism for translating the vibratory motion of the armature into rotary motion of the wheel, said mechanism including a movable abutment member adapted to bear against the armature to receive vibratory motion therefrom, and adjustable means for shifting the point of engagement of said abutment member with the vibratory armature between said points, to vary the stroke of said mechanism and thus the speed of rotation of the wheel.

5. A construction in accordance with claim 4 in which said adjustable means comprises a lever pivotally mounted on said armature and engaging said abutment member.

6. In a vibration motor having an electromagnetically vibrated armature constituting a driving element and a wheel constituting a driven element, mechanism engaging the armature and the wheel for translating the vibratory motion of the armature into rotary motion of the wheel, including a clutch lever extended in a direction generally transverse the plane of rotation of the wheel and having opposed friction gripping surfaces cooperating with complementary surfaces on the wheel, the lever being oscillatable under the influence of vibratory impulses to alternately tighten and release its frictional engagement with the wheel and thereby to advance the wheel step-by-step and being mounted with freedom for reciprocatory movement with respect to the armature toward and away from the wheel to provide for self-adjustment of the lever as to its position of frictional gripping engagement with the wheel, and said mechanism further including means providing for rocking of the lever about an axis generally transverse the plane of rotation of the wheel during each driving stroke to follow the arcuate motion of that portion of the wheel engaged by the lever during that stroke.

7. A construction in accordance with claim 6 wherein said means providing for rocking of the clutch lever incorporates a pivot with its axis coincident with the axis of the wheel.

8. A construction in accordance with claim 6 wherein said means providing for rocking of the clutch lever incorporates a pivotal mounting for the lever having a pivot axis approximately coincident with that of the lever itself.

9. In a vibration motor having an electromagnetically vibrated armature constituting a driving element and a wheel constituting a driven element, mounting means for the armature providing for angular vibratory movement thereof so that one point on the armature has a longer vibratory stroke than another point, a member mounted for angular oscillation about the axis of the wheel, a pin projecting from said member in a direction generally paralleling a line joining said points, an abutment member shiftably mounted on said pin and adapted to engage the armature at points having different lengths of vibratory stroke, and mechanism interconnecting said oscillatable member and the wheel for converting the oscillatory motion of said member to rotary motion of said wheel.

10. A construction in accordance with claim 9 in which said mechanism for interconnecting the oscillatory member and the wheel comprises a clutch lever having opposed friction gripping surfaces cooperating with complementary surfaces on the wheel, the lever being oscillatable under the influence of vibratory impulses to alternately tighten and release its frictional engagement with the wheel and thereby to advance the wheel step-by-step and being mounted with freedom for reciprocatory movement with respect to the oscillatory member in a direction toward and away from the wheel to provide for self-adjustment of the lever as to its position of frictional gripping engagement with the wheel.

11. In a vibration motor having an electromagnetically vibrated armature constituting a driving element and a wheel constituting a driven element, mechanism engaging the armature and the wheel for translating the vibratory motion of the armature into rotary motion of the wheel, including a clutch lever having opposed friction gripping surfaces cooperating with complementary surfaces on the wheel, the lever being oscillatable under the influence of vibratory impulses to alternately tighten and release its frictional engagement with the wheel and thereby to advance the wheel step-by-step and being mounted with freedom for reciprocatory movement with respect to the armature toward and away from the wheel to provide for self-adjustment of the lever as to its position of frictional gripping engagement with the wheel, and said mechanism further including means providing for rocking of the lever during each driving stroke to follow the arcuate motion of that portion of the wheel engaged by the lever during that stroke.

12. In a vibration motor having an electromagnetically vibrated armature constituting a driving element and a wheel constituting a driven element, mechanism for translating the vibratory motion of the armature into rotary motion of the wheel including an oscillative member pivotally mounted coaxially of the wheel, the armature and said member being relatively movable but said member being in engagement with the armature to convert the vibratory motion of the armature into oscillatory motion of said member, and a clutch lever having opposed friction gripping surfaces cooperating with complementary surfaces of the wheel and adapted to alternately engage and release upon oscillation of said lever and thereby to advance the wheel step-by-step, the clutch lever being in engagement with said oscillative member to convert the oscillatory movement thereof into rotary motion of said wheel.

13. In a vibration motor having an electromagnetically vibrated armature constituting a driving element and a wheel constituting a driven element, a member mounted for angular oscillation about the axis of the wheel, the armature and said member being relatively movable but said member being in engagement with the armature to convert the vibratory motion thereof to oscillative motion of said member, and a clutch lever having opposed friction gripping surfaces cooperating with complementary surfaces of the wheel and adapted to alternately engage and release upon oscillation of said lever and thereby advance the wheel step-by-step, the clutch lever being in motion transmitting engagement with said oscillative member and having freedom for movement with respect to said member in a direction toward and away from the wheel to provide freedom for self-adjustment of the clutch lever as to its position of friction gripping engagement with the wheel.

14. In a vibration motor having an electromagnetically vibrated armature constituting a driving element and a wheel constituting a driven element, a member mounted for angular oscillation about the axis of the wheel, the armature and said member being relatively movable but said member being in engagement with the armature to convert the vibratory motion thereof to oscillative motion of said member, and a clutch lever extended generally transverse the plane of rotation of the wheel and having opposed friction gripping surfaces cooperating with complementary surfaces of the wheel, which surfaces are adapted to alternately tighten and release upon angular oscillation of the lever, and the oscillatable member and the lever being in engagement with each other whereby to transmit oscillatory motions from the former to the latter, the interengaging means constraining said lever to partake of the oscillatory motion of said member about the axis of the wheel.

15. In a vibration motor having an electromagnetically vibrated armature constituting a driving element and a wheel constituting a driven element, mechanism for translating the vibratory motion of the armature into rotary motion of the wheel including a clutch lever having opposed friction gripping surfaces cooperating with complementary surfaces of the wheel and adapted alternatively to tighten and release the grip on the wheel upon angular oscillation of the clutch lever, and pivot linkage interconnecting the clutch lever and the armature, said linkage incorporating two pivot axes and providing freedom for movement of the clutch lever with respect to the armature in a direction toward and away from the wheel.

16. A construction in accordance with claim 15 in which the pivots of the linkage further provide freedom for rocking motion of the clutch lever substantially about its own major axis.

17. A construction in accordance with claim 15 in which the pivot linkage includes a link extended generally parallel to the plane of rotation of the wheel, pivot means connecting one end of said link with the armature, and universal joint means connecting the other end of said link with the clutch lever.

18. A construction in accordance with claim 15 in which the pivot linkage includes a link extended generally parallel to the plane of rotation of the wheel, pivot means connecting one end of said link with the armature, and a ball and socket joint connecting the other end of said link with the clutch lever.

ROBERT M. MILLER.